US005967109A

United States Patent [19]

Bruce et al.

[11] Patent Number: 5,967,109

[45] Date of Patent: Oct. 19, 1999

[54] COUNTERBORED JOINT

[75] Inventors: Judson R. Bruce, Chillicothe; Randy L. Marquis, Dunlap, both of Ill.

[73] Assignee: Caterpillar Inc., Peoria, Ill.

[21] Appl. No.: 08/947,710

[22] Filed: Oct. 9, 1997

[51] Int. Cl.[6] ..................... F16G 11/04

[52] U.S. Cl. ..................... 123/193.2

[58] Field of Search ..................... 123/193.2, 193.1, 123/193.4

[56] References Cited

U.S. PATENT DOCUMENTS

| | | | |
|---|---|---|---|
| 1,816,819 | 8/1931 | Austin . | |
| 2,435,837 | 2/1948 | Larson . | |
| 2,783,748 | 3/1957 | Brenneke . | |
| 2,903,309 | 9/1959 | Brand . | |
| 2,951,472 | 9/1960 | Skubic | 123/41.72 |
| 3,842,718 | 10/1974 | Malchow | 123/193.2 |
| 3,882,842 | 5/1975 | Bailey et al. | 123/193.2 |
| 4,294,203 | 10/1981 | Jones | 123/193.2 |
| 4,305,348 | 12/1981 | Martin | 123/42.82 |
| 4,370,952 | 2/1983 | Mettig et al. | 123/41.84 |
| 4,399,783 | 8/1983 | Hauser | 123/193.2 |
| 4,796,572 | 1/1989 | Heydrich | 123/193.2 |
| 4,872,396 | 10/1989 | Wimbush . | |
| 4,986,230 | 1/1991 | Panyard et al. . | |

*Primary Examiner*—Marguerite McMahon

*Attorney, Agent, or Firm*—Larry G. Cain; Alan J. Hickman

[57] ABSTRACT

Past applications have found that a joint becomes damaged due to the high loading and vibration loads in which it encounters during operation. The counterbored joint utilizes the flexible shim that is larger than the body receiving bore. A undercut is machined into the body receiving bore which allows for the flexible shim to be placed within the body receiving bore between the first and second step surfaces. The first step surface is parallel to the second step surface which distributes stresses uniformly and helps in sealing. The principal use is for a cylinder liner joint, however any joint that is highly loaded or encounters vibrational loads will benefit from this invention. For example, a hydraulic joint that utilizes a piston in operation may be remanufactured with this invention.

12 Claims, 1 Drawing Sheet

COUNTERBORED JOINT

TECHNICAL FIELD

This invention relates generally to a counterbored joint and more particularly to a counterbored joint having a flexible shim and a step surface.

BACKGROUND ART

It has been found difficult to manufacture a cast cylinder block where the working surfaces of the cylinders are free from fretting and wear. As typical in the art, the cylinder block is counterbored and a cylinder liner is inserted. Over time the cylinder block becomes damaged due to the high loading and component relative motion which is encountered during operation of the internal combustion engine. As a result the joint that holds the cylinder liner in place requires remanufacture. One method of remanufacturing the joint includes re-machining an undercut in the joint of the cylinder block to a pre-determined depth and inserting a ring or shim generally equal to the depth of the undercut. It is critically important that the joint allows the cylinder liner shim to be centrally located and parallel with the cylinder liner bore. One potential source of damage is due to the undercut being rounded at its outer surface and not allowing the ring to sit flat on the joint of the cylinder block. The rounded undercut and ring generally weakens the cylinder block with a non uniform stress concentration. Another potential problem, the rounded surface of the counterbore or undercut generally causes problems with sealing between the cylinder block and cylinder liner.

Various rings have been developed in an attempt to improve the stress distribution of the joint in a counterbored cylinder block. For example, U.S. Pat. No. 3,389,693 to Herschmann discloses a ring that has a cross section whose width to length ratio is at least a 1:1 which supposedly provides a more rigid joint. However, the ring disclosed requires a large undercut to be machined into the cylinder block. In many applications this may not be feasible.

The present invention is directed to overcoming one or more of the problems as set forth above.

DISCLOSURE OF THE INVENTION

In one aspect of the present invention, a remanufactured joint includes a casing having a body receiving bore. The body receiving bore is defined by a first portion, a second portion, and an intermediate portion located between the first and second portions. The intermediate portion has a first step surface and a lobe engaging surface. The first portion has a first predetermined diameter. The second portion has a second predetermined diameter. The second predetermined diameter is smaller in magnitude than the first predetermined diameter. A first flexible shim has a main body and a plurality of spaced lobes which are connected to the main body. The first flexible shim is disposed in the body receiving bore. The main body is engaged with the first step surface and the plurality of spaced lobes are engaged with the lobe engaging surface. A body has a first body portion, a second body portion, and a second step surface which is located between the first and second body portions. The first body portion is engaged with the first portion. The second body portion is engaged with the second portion and the second step surface is forcibly engaged with the main body.

In another aspect of the present invention, a counterbored joint includes a cylinder block which has a cylinder liner receiving bore. The cylinder liner receiving bore is defined by a first portion, a second portion, and an intermediate portion located between the first and second portions. The intermediate portion has a first step surface and a lobe engaging surface. The first portion has a predetermined diameter and the second portion has a second predetermined diameter. The second predetermined diameter is smaller in magnitude than the first predetermined diameter. A first flexible shim has a main body and a plurality of spaced lobes which are connected to the main body. The first flexible shim is disposed in the cylinder liner receiving bore. The main body is engaged with the first step surface and the plurality of spaced lobes are engaged with the lobe engaging surface. The cylinder liner has a first liner portion, a second liner portion, and a second step surface which is located between the first and second liner portions. The first liner portion is engaged with the first portion and the second liner portion is engaged with the second portion. The second step surface is forcibly engaged with the main body.

In yet another aspect of the present invention, a method of assembling a body, having a second step surface in a counterbored joint of a casing having a body receiving bore is provided. The body receiving bore has a longitudinal axis and is defined by a first portion, a second portion, and an intermediate portion located between the first and second portions. The intermediate portion is undercutted about the longitudinal axis to a predetermined depth and has a first step surface and a lobe engaging surface. The method comprises of: deforming a first flexible shim having a main body, a plurality of lobes, and a predetermined thickness substantially equal to said predetermined depth of the undercut; positioning the first flexible shim in the undercut and engaging the main body of the flexible shim with the first step surface and the plurality of lobes engaging the lobe engaging surface; positioning the body in the body receiving bore; engaging the second step surface of the body with the first flexible shim, and urging the first flexible shim between the body and the casing to cause bending of the plurality of lobes.

BEST MODE FOR CARRYING OUT THE INVENTION

Figure 1:
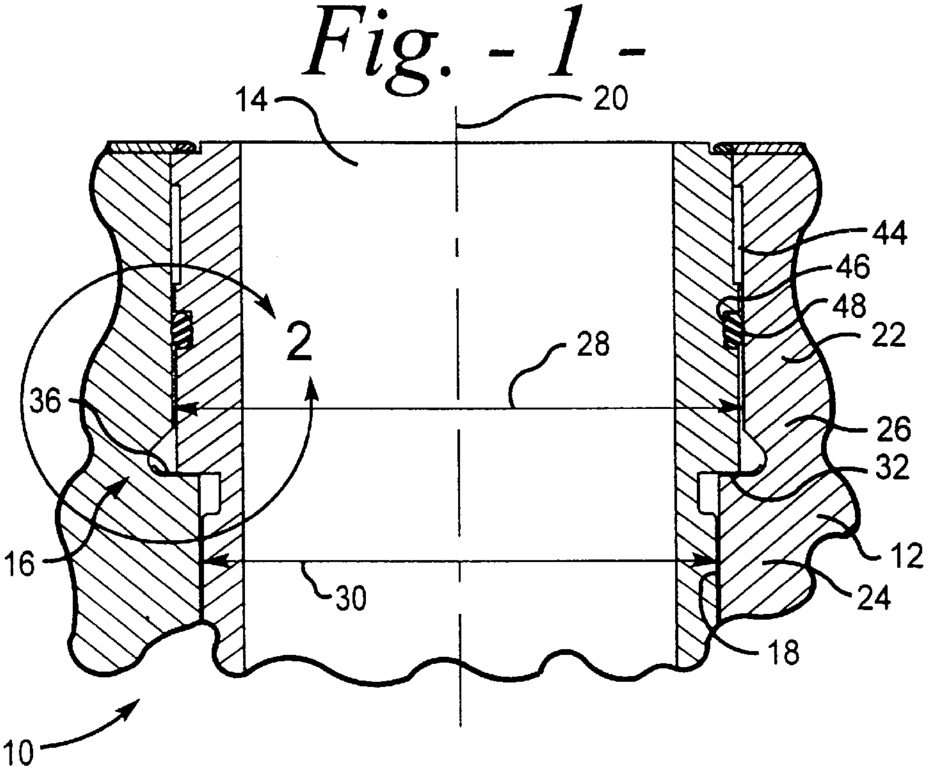
FIG. 1 is a diagrammatic partial cross-sectional view of a cylinder liner joint embodying the present invention.

Referring to FIG. 1, a partial view of an internal combustion engine 10 is shown with one embodiment of the present invention. In this embodiment a casing 12 and body 14 are shown having a joint 16, for example, a cylinder liner joint 16. It should be recognized that other embodiments are suitable for use with the present invention depending on the application. Examples are, a bearing, race, shell, or static square cornered assemblies that do not depart from the spirit of the invention.

The casing 12 includes a plurality of body receiving bores 18 each having a longitudinal axis 20. The body receiving bore 18 includes a first portion 22, a second portion 24, and an intermediate portion 26. The first portion 22 has a first predetermined diameter 28 and is generally parallel to the longitudinal axis 20. The second portion 24 has a second predetermined diameter 30 and is generally parallel to the longitudinal axis 20. The second predetermined diameter 30 is smaller in magnitude than the first predetermined diameter 28. The intermediate portion 26 is located between the first and second portion 22, 24 of the body receiving bore 18. The intermediate portion 26 has a first step surface 32 and a lobe engaging surface 34. The lobe engaging surface 34 will be discussed later in detail. The first step surface 32 is radially disposed about and substantially perpendicular to the longitudinal axis 20. The first step surface 32 engages a flexible shim 36. The flexible shim 36 will be discussed later in detail.

The body 14 includes a first body portion 38, a second body portion 40, and a second step surface 42. The body 14 is piloted by and slidably disposed in the body receiving bore 18. The first body portion 38 engages the first portion 22 of the body receiving bore 18. The first body portion 38 includes a fluid passing cavity 44 and an annular groove 46. Fluid in the cavity 44 is used to cool the body 14 during operation. The cavity 44 is sealed using a sealing ring 48 disposed in the annular groove 46. The second body portion 40 is slidably engaged with the second portion 24 of the body receiving bore 18. The second step surface 42 is located between the first and second body portions 38, 40. The second step surface 42 is radially disposed about and substantially perpendicular to the longitudinal axis 20. The first step surface 32 is substantially parallel to the second step surface 42.

Figure 2:
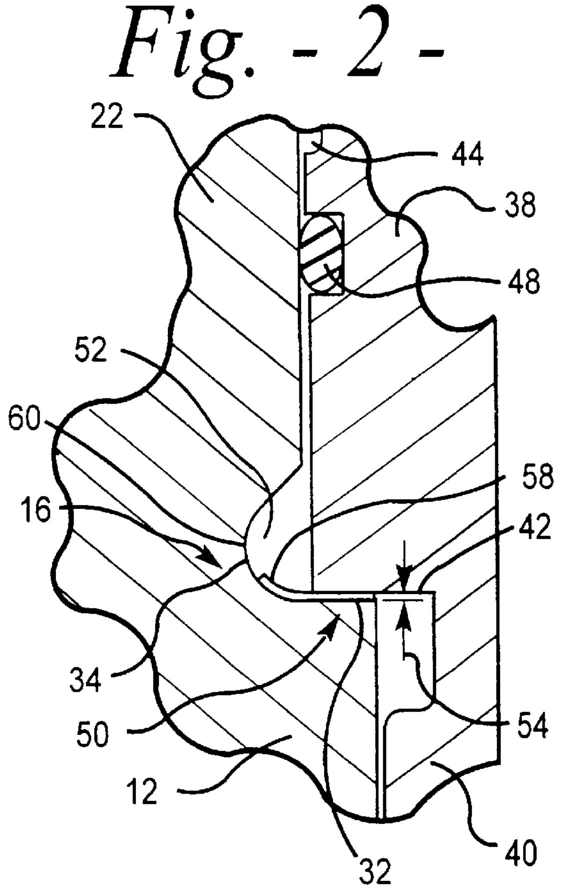
FIG. 2 is a diagrammatic exploded partial cross-sectional view of a portion of the cylinder liner joint of FIG. 1 embodying the present invention.

Referring to FIG. 2, the joint 16 includes the flexible shim 36 disposed between the body receiving bore 18 and the body 14. The flexible shim 36 is generally made of a stainless steel material that is heat treated. Other materials may be used depending on the application. For example, a copper material may be used to improve sealing of the lower fluid seal 50. The flexible shim 36 is sandwiched between the first and second step surfaces 32, 42. However, multiple flexible shims 36 may be used depending on the wear of the casing 12. Counterbored joints 16 require an undercut 52 to be machined into the intermediate portion 26 of the body receiving bore 18 to a predetermined depth 54. In most cases, the predetermined depth 54 of the undercut 52 is equal to the flexible shim 36 having a thickness between 0.20 mm and 0.50 mm. In other cases, the predetermined depth 54 is equal to the thickness of multiple flexible shims 36 (not shown) that are required for eradicating defects in the casing 12. The flexible shim 36 includes a main body 56 and the plurality of lobes 58. The main body 56 is substantially parallel to the first and second step surfaces 32, 42 providing a lower fluid seal 50 that is fluid tight. A plurality of lobes 58 are connected to the main body 56 and are disposed in the undercut 52. The plurality of lobes 58 engage the lobe engaging surface 34. The lobe engaging surface 34 includes the machined undercut 52. The lobe engaging surface 34 has a tapered portion 60 that is substantially curved and located between the first portion 22 of the casing 12 and the first step surface 32 of the intermediate portion 26. The tapered portion 60 engages a plurality of lobes 58 of the flexible shim 36 to centrally position the flexible shim 36 with the longitudinal axis 20.

Figure 3:
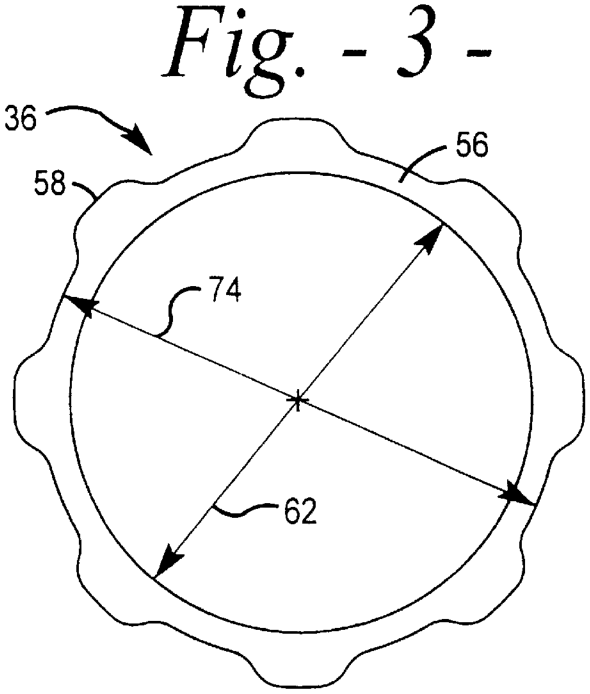
FIG. 3 is a diagrammatic top plan view of a cylinder liner shim of the cylinder liner joint of FIG. 1 embodying the present invention.

Referring to FIG. 3, the flexible shim 36 having a predetermined thickness and includes the main body 56 and the plurality of lobes 58. The main body 56 includes an inner diameter 62 and the outer diameter 74. The main body 56 engages the first and second step surfaces 32, 42. The inner diameter 62 is substantially equal to the second predetermined diameter 30 of the body receiving bore 18. The outer diameter 74 is greater in magnitude than the first predetermined diameter 28 of the body receiving bore 18. The plurality of lobes 58 are substantially connected to the main body 56 at the outer diameter 64.

Industrial Applicability

With reference to the figures and in operation, deformations of the body receiving bore 18 caused by manufacture or operation is corrected by using the flexible shim 36. The flexible shim 36 improves the stress concentration and sealing characteristics that are normally present when placing the shim on the undercut 52. The ability to undercut the joint 16 using the flexible shim 36 with a generally smaller thickness than prior shims reduces the amount of material that is machined from the casing 12.

In operation, the undercut 52 is machined into the intermediate portion 26 of the body receiving bore 18 about the longitudinal axis 20 to the predetermined depth 54. The undercut 52 is machined using conventional tooling that is well know in the art. The undercut 52 has a first step surface 32 being substantially flat and lobe engaging surface 34 having the tapered portion 60.

A method of assembling the body 14 having the second step surface 42 with the casing 12 having the body receiving bore 18. The casing 12 is made of cast iron reducing thermal growth differentials and associated stresses of operation of the internal combustion engine 10. It should be recognized that the method of assembly is suitable for use in applications requiring multiple flexible shims 36 without departing from the spirit of the invention. Deform the flexible shim 36 which has the main body 56, and the plurality of lobes 58. Position the flexible shim 36 in the undercut 52. The main body 56 of the flexible shim 36 engages the first step surface 32. The plurality of lobes 58 of the flexible shim 36 engages the lobe engaging surface 34. The flexible shim 36 has an elastomer characteristic that enables the flexible shim 36 to return to its original shape. Applications utilizing multiple shims would deform and position the next flexible shim 36 at this point in the method of assembly. Position the body 14 in the body receiving bore 18 having the second body portion 40 slidably engaged with the body receiving bore 18. This provides rigidity to the body 14 during operation of the internal combustion engine 10. Engage the second step surface 42 of the body 14 with the flexible shim 36. A clamping force is applied to the shim 36 by the first and second step surfaces 32, 42. The clamp force causes bending of the plurality of lobes 58 to maintain a central position of the body 14 within the body receiving bore 18.

Counterbored joints 16 using the flexible shim 36 made of the described materials allows the flexible shim 36 to be thinner and simplifies the manufacturing processes for the shim 36. The flexible shim 36 is able to return to its original shape subsequent to being disposed in the intermediate portion 26 of the body receiving bore 18. The shim 36 allows the outer diameter 64 to be greater in magnitude than the first predetermined diameter 28 of the body receiving bore 18. In operation, the machining of an undercut 52 requires that the undercut 52 be rounded to minimize cracks at the joint 16. Using the flexible shim 36 increases rigidity to the joint 16 and increases the sealing characteristics of the joint 16. The flexible shim 36 allows for the body 14 to be centrally located in the body receiving bore 18. Having the body 14 centrally located improved lower fluid sealing and evenly distributed forces at the joint 16. The plurality of lobes 58 bending about the lobe engaging surface 34 of the undercut 52 from the applied clamp force maintains the body 14 location in the body receiving bore 18. The flexible shim 36 blocks fluid from entering the intermediate portion 26 from the second portion 24. The flexible shim 36 evenly distributes the forces at the joint having the main body 56 being parallel to the first and second step surfaces 32, 42. The body 14 being centrally located in the body receiving bore 18 reduces operational wear on the casing 12.

We claim:

1. A counterbored joint, comprising:

a cylinder block having a cylinder liner receiving bore defined by a first portion, a second portion, and an intermediate portion located between said first and second portions, said intermediate portion having a first step surface and a lobe engaging surface, said first portion having a first predetermined diameter and said second portion having a second predetermined diameter, said second predetermined diameter being smaller in magnitude than said first predetermined diameter;

a first flexible shim having a main body and a plurality of spaced lobes being connected to the main body, said first flexible shim being disposed in said cylinder liner receiving bore, said main body being engaged with said first step surface and said plurality of spaced lobes being engaged with said lobe engaging surface; and a cylinder liner having a first liner portion, a second liner portion, and a second step surface located between said first and second liner portions, said first liner portion being engaged with said first portion and said second liner portion being engaged with said second portion, said second step surface being forcibly engaged with said main body.

2. The counterbored joint, as set forth in claim 1, wherein said first flexible shim having an elastomer characteristic enabling said first flexible shim to have the ability to return to an original shape subsequent to being disposed in the intermediate portion of said body receiving bore.

3. The counterbored joint, as set forth in claim 2, including a second flexible shim being disposed in said body receiving bore, said first and second flexible shims being sandwiched between said first and second step surfaces.

4. The counterbored joint, as set forth in claim 1, wherein said plurality of lobes bending in response to a clamping force being applied to said shim by said first and second step surfaces.

5. The counterbored joint, as set forth in claim 1, wherein said first flexible shim distributing forces uniformly about said first step surface and said second step surface.

6. The counterbored joint, as set forth in claim 1, wherein said first flexible shim provides a fluid tight seal between said body and said casing, said fluid seal blocking fluid entering said intermediate portion from said first portion.

7. The counterbored joint, as set forth in claim 1, wherein said cylinder liner is clamped between a cylinder head gasket and said cylinder block.

8. The counterbored joint, as set forth in claim 1, wherein said body receiving bore having a longitudinal axis, said first and second step surfaces being radially disposed about said longitudinal axis and said first step surface being substantially parallel to said second step surface.

9. The counterbored joint, as set forth in claim 8, wherein said first and second step surfaces being substantially perpendicular to said longitudinal axis.

10. The counterbored joint, as set forth in claim 1, wherein said lobe engaging surface having a tapered portion being substantially curved located between said first portion and said first step surface of said body receiving bore.

11. The counterbored joint, as set forth in claim 1, wherein said main body of said flexible shim being substantially circular, having a pre-determined thickness, and substantially flat.

12. The counterbored joint, as set forth in claim 1, wherein said body being piloted by and slidably disposed in said body receiving bore.

* * * * *